United States Patent
Suetsugu et al.

(10) Patent No.: US 6,828,079 B2
(45) Date of Patent: Dec. 7, 2004

(54) CHEMICAL AMPLIFICATION TYPE POSITIVE RESIST COMPOSITION

(75) Inventors: Masumi Suetsugu, Toyonaka (JP); Airi Yamada, Ibaraki (JP); Yasunori Uetani, Toyonaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/233,519

(22) Filed: Sep. 4, 2002

(65) Prior Publication Data

US 2003/0114589 A1 Jun. 19, 2003

(30) Foreign Application Priority Data

Sep. 6, 2001 (JP) ......................................... 2001-269960
Feb. 27, 2002 (JP) ......................................... 2002-051036

(51) Int. Cl.$^7$ ............................ G03C 1/73; G03F 7/039
(52) U.S. Cl. ...................... 430/270.1; 525/143; 525/134
(58) Field of Search ................................ 525/143, 134; 430/270.1

(56) References Cited

U.S. PATENT DOCUMENTS 6,033,827 A * 3/2000 Itani ........................ 430/270.1

FOREIGN PATENT DOCUMENTS

| EP | 0 284 868 A2 | 10/1988 |
| EP | 0 586 860 A3 | 3/1994 |
| EP | 0 586 860 A2 | 3/1994 |
| JP | 06-035186 A | 2/1994 |

\* cited by examiner

Primary Examiner—Jeffrey B. Robertson
(74) Attorney, Agent, or Firm—Birch, Stewart, Kolasch & Birch, LLP

(57) ABSTRACT

A chemical amplification type positive resist composition comprising a novolak resin, a resin insoluble or poorly soluble itself in an alkali aqueous solution but becoming soluble in an alkali aqueous solution by the action of an acid, and an acid generator, wherein when the novolak resin is measured by gel permeation chromatography (GPC) using a 254 nm UV detector using polystyrene as a standard, the area ratio of components having molecular weights of 1000 or less is 25% or less based on the total pattern area excepting unreacted monomers; and the chemical amplification type positive resist composition can reduce cost without deteriorating basic abilities such as sensitivity, resolution and the like, and shows small unevenness due to standing wave, and can improved pattern profile, particularly, line edge roughness.

4 Claims, No Drawings

CHEMICAL AMPLIFICATION TYPE POSITIVE RESIST COMPOSITION

BACKGROUND OF THE INVENTION

1. Field of the Invention

The present invention relates to a resist composition suitable for lithography and the like, acting by radiation ray of high energy such as far ultraviolet ray (including excimer laser and the like), electron beam, X ray or radiation light and the like.

2. Description of Related Art

Recently, with progress in higher integration of integrated circuits, there occurs a requirement for formation of submicron patterns. Particularly, lithography using excimer laser from krypton fluoride or argon fluoride is paid to attention since it enables production of 64 M DRAM to 1 G DRAM. As the resist suitable for such an excimer laser lithography process, there is a tendency to adoption of a so-called chemical amplification type resist utilizing chemical amplification effect. In the case of the chemical amplification type resist, an acid generated from an acid generator at parts irradiated with radiation diffuses by the subsequent heat treatment (post exposure bake: hereinafter, abbreviated as PEB), and solubility of the irradiated parts in an alkali developer is changed in a reaction using this acid as a catalyst, and by this, positive patterns are provided.

A chemical amplification type positive resist is characterized by containing of a resin insoluble or poorly soluble itself in an alkali aqueous solution but becoming soluble in an alkali aqueous solution by the action of an acid, and an acid generator. However, such a resin is expensive.

When the protection ratio of a group unstable to an acid in a resin insoluble or poorly soluble itself in an alkali aqueous solution but becoming soluble in an alkali aqueous solution by the action of an acid is increased, resolution is improved in general. However, there are defects that unevenness due to standing wave of patterns increases, and pattern profile, particularly, line edge roughness deteriorates, and irregularity of process dimension increases.

If permeability of a photoresist is lowered to decrease unevenness due to standing wave of patterns and line edge roughness, resolution deteriorates.

SUMMARY OF THE INVENTION

An object of the present invention is to provide a chemical amplification type positive resist composition which decreases cost without lowering basic abilities such as sensitivity, resolution and the like, causes small unevenness by standing wave, and shows improved pattern profile, particularly, improved line edge roughness.

The present inventors have intensively studied to attain such an object, and resultantly found that cost can be reduced greatly without significantly deteriorating basic abilities of a resist, by mixing a specific novolak resin having a low content of components of lower molecular weights, in addition to a resin insoluble or poorly soluble itself in an alkali aqueous solution but becoming soluble in an alkali aqueous solution by the action of an acid, as the resin component of a chemical amplification type positive resist. The present invention was thus completed.

Namely, the present invention provides to a chemical amplification type positive resist composition comprising a novolak resin, a resin insoluble or poorly soluble itself in an alkali aqueous solution but becoming soluble in an alkali aqueous solution by the action of an acid, and an acid generator, wherein when the novolak resin is measured by gel permeation chromatography (GPC) using a 254 nm UV detector using polystyrene as a standard, the area ratio of components having molecular weights of 1000 or less is 25% or less based on the total pattern area excepting unreacted monomers.

DETAILED DESCRIPTION OF PREFERRED EMBODIMENTS

In the resist composition of the present invention, the resin is insoluble or poorly soluble itself in an alkali aqueous solution but becomes soluble in an alkali aqueous solution by the action of an acid. As this resin, specifically mentioned is a resin which has a structural unit carrying a group unstable to an acid, and becomes soluble in an alkali aqueous solution after dissociation of the group unstable to an acid by the action of an acid.

Mentioned as examples of such a resin are those obtained by introducing a protective group which can be dissociated by the action of an acid into an alkali-soluble resin such as resins having a phenol skeleton and resins having a (meth) acrylic acid skeleton.

As such a group having an ability of suppressing dissolution into an alkali developer but unstable to an acid, groups in which quaternary carbon is bonded to an oxygen atom, acetal type groups, residues of non-aromatic cyclic compounds, and the like are exemplified.

These protective groups can be introduced into an alkali-soluble resin having a phenolic hydroxyl group or carboxyl group by a known protective group introducing reaction. These are substituted for hydrogen on a phenolic hydroxyl group or hydrogen on a carboxyl group. The above-mentioned resins can also be obtained by copolymerization using as one monomer an unsaturated compound having such a group.

Examples of the protective group include groups in which quaternary carbon is bonded to an oxygen atom such as tert-butyl, tert-butoxycarbonyl or tert-butoxycarbonymethyl; acetal type groups such as 1-ethoxyethyl, 1-(2-methylpropoxy)ethyl, 1-(2-methoxyethoxy)ethyl, 1-(2-acetoxyethoxy)ethyl, 1-[2-(1-adamantyloxy)ethoxy]ethyl, 1-[2-(1-adamantanecarbonyloxy)ethoxy]ethyl, tetrahydro-2-pyranyl, tetrahydro-2-furyl; residues of non-aromatic cyclic compounds such as 3-oxocyclohexyl, 4-methyltetrahydro-2-pyron-4-yl (derived from mevalonic lactone) or 2-methyl-2-adamantyl, 2-ethyl-2-adamantyl.

Specifically, as the resin insoluble or poorly soluble itself in an alkali aqueous solution but becoming soluble in an alkali aqueous solution by the action of an acid in the present invention, listed are resins having a structural unit of the following formula (I) in which hydrogen on a phenolic hydroxyl group in a resin having a phenol skeleton is substituted by an acetal type group:

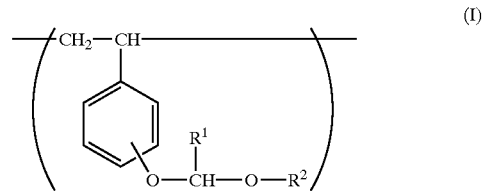

wherein, $R^1$ represents an alkyl having 1 to 4 carbon atoms, and $R^2$ represents an alkyl having 1 to 6 carbon atoms or a cycloalkyl having 5 to 7 carbon atoms, provided that $R^1$ and $R^2$ may together form a trimethylene chain or tetramethylene chain.

In the formula (I), $R^1$ represents preferably methyl, and $R^2$ represents preferably ethyl, propyl and further preferably ethyl.

In addition to the resin of formula (I), as the resin, listed are also resins having at least one structural unit selected from the following formulae (IIa), (IIb) and (IIc) in which hydrogen on a carboxyl group in a resin having a (meth) acrylic acid skeleton is substituted by a residue of a non-aromatic cyclic compound or a group in which quaternary carbon is bonded to an oxygen atom.

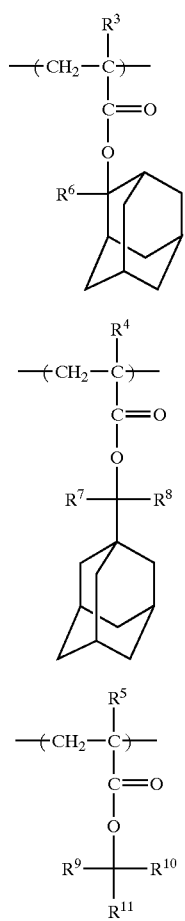

wherein, $R^3$ to $R^5$ represent each independently hydrogen or methyl, and $R^6$ to $R^{11}$ represent each independently an alkyl having 1 to 8 carbon atoms.

In the formulae (IIa), (IIb) and (IIc), $R^6$ represents preferably methyl or ethyl, $R^7$ and $R^8$ represent each independently methyl or ethyl, and $R^9$ to $R^{11}$ represents preferably butyl.

Further mentioned as the resin are resins having a structural unit derived from a (meth)acrylic acid skeleton as described above and a structural unit derived from p-hydroxystyrene.

Also mentioned as the resin are resins having at least one structural unit derived from a monomer selected from 3-hydroxy-1-adamantyl methacrylate and (meth) acrylonitrile.

In the resist composition of the present invention, when the novolak resin is measured by gel permeation chromatography (GPC) using a 254 nm UV detector using polystyrene as a standard, the area ratio of components having molecular weights of 1000 or less (hereinafter, sometimes referred to as simply area ratio) is 25% or less, preferably 20% or less based on the total pattern area excepting unreacted monomers. The novolak resin is extremely effective to decrease cost of a resist, since the novolak resin is extremely cheap as compared with resins commonly used in chemical amplification type resists. When the area ratio is over 25%, the resolution of a resist may deteriorate significantly.

The novolak resin is usually obtained by condensing a phenolic compound and an aldehyde in the presence of an acid catalyst. Examples of the phenol-based compound used in production of the novolak resins include phenol, o-, m- or p-cresol, 2,3-, 2,5-, 3,4- or 3,5-xylenol, 2,3,5-trimethylphenol, 2-, 3- or 4-tert-butylphenol, 2-tert-butyl-4- or 5-methylphenol, 2-, 4- or 5-methylresorcinol, 2-, 3- 4-methoxyphenol, 2,3-, 2,5- or 3,5-dimethoxyphenol, 2-methoxyresorcinol, 4-tert-butylcatechol, 2-, 3- or 4-ethylphenol, 2,5- or 3,5-diethylphenol, 2,3,5-triethylphenol, 2-naphthol, 1,3-, 1,5- or 1,7-dihydroxynaphthalene, polyhydroxytriphenylmethane-based compounds obtained by condensation of xylenol and hydroxybenzaldehyde, and the like. These phenol compounds can be used alone or in combination of two or more.

Examples of the aldehyde used in production of the novolak resin include aliphatic aldehydes such as formaldehyde, acetaldehyde, propionaldehyde, n-butylaldehyde, isobutylaldehyde, acrolein or crotonaldehyde; alicyclic aldehydes such as cyclohexanealdehyde, cyclopentanealdehyde, furfural or furylacrolein; aromatic aldehydes such as benzaldehyde, o-, m- or p-methylbenzaldehyde, p-ethylbenzaldehyde, 2,4-, 2,5-, 3,4- or 3,5-dimethylbenzaldehyde or o-, m- or p-hydroxybenzaldehyde; aromatic aliphatic aldehydes such as phenylacetaldehyde or cinnamic aldehyde; and the like. These aldehydes can also be used each alone or in combination of two or more. Of these aldehydes, formaldehyde is preferably used since it is industrially obtainable easily.

Examples of the acid catalyst used in condensation of a phenol-based compound with an aldehyde include inorganic acids such as hydrochloric acid, sulfuric acid, perchloric acid or phosphoric acid; organic acids such as formic acid, acetic acid, oxalic acid, trichloroacetic acid or p-toluenesulfonic acid; divalent metal salts such as zinc acetate, zinc chloride or magnesium acetate. These acid catalysts can also be used each alone or in combination of two or more. The condensation reaction can be conducted according an ordinary method, for example, conducted at temperatures in the range from 60 to 120° C. for about 2 to 30 hours.

A novolak resin thus obtained by condensation can be subjected to operations, such as for example, fractionation and the like, to obtain a novolak resin having a area ration of 25% or less according to the present invention.

When radiation ray such as light, electron beam and the like acts on an acid generator itself in the resist composition of the present invention or on the resist composition containing this substance, this substance is decomposed to generate and acid. An acid generating from an acid generator acts on a resin insoluble or poorly soluble itself in an alkali aqueous solution but becoming soluble in an alkali aqueous solution by the action of an acid, to dissociate a group unstable to an acid present in the resin. Examples of such an acid generator include onium salt compounds, s-triazine-based organic halogen compounds, sulfone compounds, sulfonate compounds and the like. Specifically, the following compounds are listed.

Diphenyliodonium trifluoromethanesulfonate,
4-methoxyphenylphenyliodinium hexafluoroantimonate,
4-methoxyphenylphenyliodinium trifluoromethanesulfonate,
bis(4-tert-butylphenyl)iodonium tetrafluoroborate
bis(4-tert-butylphenyl)iodonium hexafluorophosphate,
bis(4-tert-butylphenyl)iodonium hexafluoroantimonate
bis(4-tert-butylphenyl)iodonium trifluoromethanesulfonate,
triphenylsulfonium hexafluorophosphate,
triphenylsulfonium hexafluoroantimonate,
triphenylsulfonium trifluoromethanesulfonate,
4-methylphenyldiphenylsulfonium perfluorobutanesulfonate,
4-methylphenyldiphenylsulfonium perfluorooctanesulfonate,
4-methoxyphenyldiphenylsulfonium hexafluoroantimonate,
4-methoxyphenyldiphenylsulfonium trifluoromethanesulfonate,
p-tolyldiphenylsulfonium trifluoromethanesulfonate,
2,4,6-trimethylphenyldiphenylsulfonium trifluoromethanesulfonate,
4-tert-butylphenyldiphenylsulfonium trifluoromethanesulfonate,
4-phenylthiophenyldiphenylsulfonium hexafluorophosphate,
4-phenylthiophenyldiphenylsulfonium hexafluoroantimonate,
1-(2-naphtholylmethyl)thiolanium hexafluoroantimonate,
1-(2-naphtholylmethyl)thiolanium trifluoromethanesulfonate,
4-hydroxy-1-naphthyldimethylsulfonium hexafluoroantimonate,
4-hydroxy-1-naphthyldimethylsulfonium trifluoromethanesulfonate,
2-methyl-2,6-bis(trichloromethyl)-1,3,5-triazine,
2,4,6-tris(trichloromethyl)-1,3,5-triazine
2-phenyl-4,6-bis(trichloromethyl)-1,3,5-triazine,
2-(4-chlorophenyl)-4,6-bis(trichloromethyl)-1,3,5-triazine,
2-(4-methoxyphenyl)-4,6-bis(trichloromethyl)-1,3,5-triazine,
2-(4-methoxy-1-naphthyl)-4,6-bis(trichloromethyl)-1,3,5-triazine,
2-(benzo[d][1,3]dioxolan-5-yl)-4,6-bis(trichloromeythyl)-1,3,5-triazine,
2-(4-methoxystyryl)-4,6-bis(trichloromethyl)-1,3,5-triazine,
2-(3,4,5-trimethoxystyryl)-4,6-bis(trichloromethyl)-1,3,5-triazine,
2-(3,4-dimethoxystyryl)-4,6-bis(trichloromethyl)-1,3,5-triazine,
2-(2,4-dimethoxystyryl)-4,6-bis(trichloromethyl)-1,3,5-triazine,
2-(2-methoxystyryl)-4,6-bis(trichloromethyl)-1,3,5-triazine,
2-(4-butoxystyryl)-4,6-bis(trichloromethyl)-1,3,5-triazine,
2-(4-pentyloxystyryl)-4,6-bis(trichloromethyl)-1,3,5-triazine,
1-benzoyl-1-phenylmethyl p-toluenesulfonate (generally called benzoin tosylate),
2-benzoyl-2-hydroxy-2-phenylethyl p-toluenesulfonate (generally called α-methylolbenzoin tosylate),
1,2,3-benzenetolyl trismethanesulfonate,
2,6-dinitrobenzyl p-toluenesulfonate,
2-nitrobenzyl p-toluenesulfonate,
4-nitrobenzyl p-toluenesulfonate,
diphenyl disulfone,
di-p-tolyl disulfone
dis(phenylsulfonyl)diazomethane,
bis(4-chlorophenylsulfonyl)diazomethane,
bis(p-tolylsulfonyl)diazomethane,
bis(4-tert-butylphenylsulfonyl)diazomethane,
bis(2,4-xylylsulfonyl)diazomethane,
bis(cyclohexylsulfonyl)diazomethane,
(benzoyl)(phenylsulfonyl)diazomethane,
N-(phenylsulfonyloxy)succinimide,
N-(trifluoromethylsulfonyloxy)succinimide,
N-(trifluoromethylsulfonyloxy)phthalimide,
N-(trifluoromethylsulfonyloxy)-5-norbornene-2,3-dicarboxyimide,
N-(trifluoromethylsulfonyloxy)naphthalimide,
N-(10-camphorsulfonyloxy)naphthalimide and the like,
(5-tosyloxyimino-5H-thiophen-2-ylidene)-(2-methylphenyl)acetonitrile,
(5-n-propylsulfonyloxyimino-5H-thiophen-2-ylidene)-(2-methylphenyl)acetonitrile,
(5-n-butylsulfonyloxyimino-5H-thiophen-2-ylidene)-(2-methylphenyl)acetonitrile,
(5-n-octylsulfonyloxyimino-5H-thiophen-2-ylidene)-(2-methylphenyl)acetonitrile,
[5-(2,4,6-trimethylphenylsulfonyloxy)imino-5H-thiophen-2-ylidene]-(2-methylphenyl)acetonitrile,
[5-(2,4,6-triisopropylphenylsulfonyloxy)imino-5H-thiophen-2-ylidene]-(2-methylphenyl)acetonitrile,
[5-(4-dodecylphenylsulfonyloxy)imino-5H-thiophen-2-ylidene]-(2-methylphenyl)acetonitrile,
[5-(4-methoxyphenylsulfonyloxy)imino-5H-thiophen-2-ylidene]-(2-methylphenyl)acetonitrile,
[5-(2-naphthylsulfonyloxy)imino-5H-thiophen-2-ylidene]-(2-methylphenyl)acetonitrile,
(5-benzylsulfonyloxyimino-5H-thiophen-2-ylidene)-(2-methylphenyl)acetonitrile,
(5-camphorsulfonyloxyimino-5H-thiophen-2-ylidene)-(2-methylphenyl)acetonitrile.

The resist composition of the present invention can improve deterioration in abilities due to deactivation of an acid following leaving after exposure, by adding as a quencher a basic compound, particularly, a basic nitrogen-containing organic compound, for example, amines. Specific examples of the basic compound used as a quencher include compounds of the following formulae.

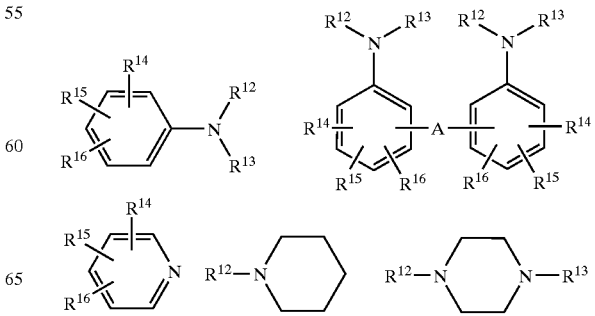

-continued

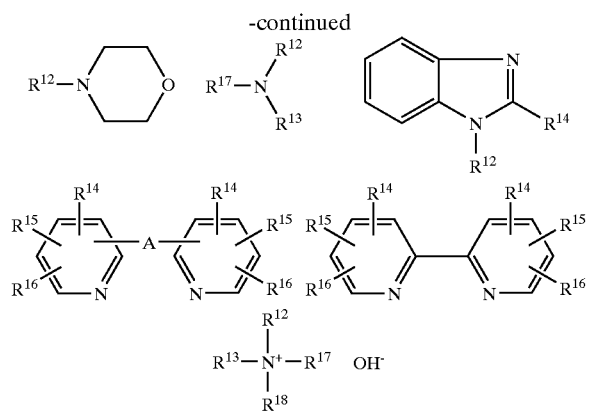

$R^{12}$, $R^{13}$ and $R^{18}$ represent each independently hydrogen alkyl, cycloalkyl or aryl. The alkyl, cycloalkyl or aryl may be optionally substituted with, a hydroxyl group, amino group or alkoxy group having 1 to 6 carbon atoms. This amino group may be substituted with an alkyl group having 1 to 4 carbon atoms. This alkyl preferably has about 1 to 6 carbon atoms, this cycloalkyl preferably has about 5 to 10 carbon atoms, and this aryl preferably has about 6 to 10 carbon atoms.

$R^{14}$, $R^{15}$ and $R^{16}$ represent each independently hydrogen, alkyl, cycloalkyl, aryl or alkoxy. The alkyl, cycloalkyl, aryl or alkoxy may be optionally substituted with a hydroxyl group, amino group or alkoxy group having 1 to 6 carbon atoms. This amino group may be substituted with an alkyl group having 1 to 4 carbon atoms. This alkyl preferably has about 1 to 6 carbon atoms, this cycloalkyl preferably has about 5 to 10 carbon atoms, this aryl preferably has about 6 to 10 carbon atoms, and this alkoxy preferably has about 1 to 6 carbon atoms.

$R^{17}$ represents alkyl or cycloalkyl. The alkyl or cycloalkyl may be optionally substituted with a hydroxyl group, amino group or alkoxy group having 1 to 6 carbon atoms. This amino group may be substituted with an alkyl group having 1 to 4 carbon atoms. This alkyl preferably has about 1 to 6 carbon atoms, and this cycloalkyl preferably has about 5 to 10 carbon atoms.

A represents alkylene, carbonyl, imino, sulfide or disulfide. The alkylene preferably has about 2 to 6 carbon atoms.

$R^{12}$ to $R^{18}$ may have any of a linear structure and a branched structure providing they can take both structures.

Specific examples of such compounds include hexylamine, heptylamine, octylamine, nonylamine, decylamine, aniline, 2-, 3- or 4-methyaniline, 4-nitroaniline, 1- or 2-naphthylamine, ethylenediamine, tetramethylenediamine, hexamethylenediamine, 4,4'-diamino-1,2-diphenylethane, 4,4'-diamino-3,3'-dimethyldiphenylmethane, 4,4'-diamino-3,4'-diethyldiphenylmethane, dibutylamine, dipentylamine, dihexylamine, diheptylamine, dioctylamine, dinonylamine, didecylamine, N-methylaniline, piperidine, diphenylamine, triethylamine, trimethylamine, tripropylamine, tributylamine, tripentylamine, trihexylamine, triheptylamine, trioctylamine, trinonylamine, tridecylamine, methyldibutylamine, methyldipentylamine, methyldihexylamine, methyldicyclohexylamine, methyldiheptylamine, methyldioctylamine, methyldinonylamine, methyldidecylamine, ethyldibutylamine, ethyldipentylamine, ethyldihexylamine, ethyldiheptylamine, ethyldioctylamine, ethyldinonylamine, ethyldidecylamine, dicyclohexylmethylamine, tris[2-(2-methoxyethoxy)ethyl]amine, triisopropanolamine, N,N-dimethylaniline, 2,6-isopropylaniline, imidazole, pyridine, 4-methylpyridine, 4-methylimidazole, bipyridine, 2,2'-dipyridylamine, di-2-pyridylketone, 1,2-di(2-pyridyl)ethane, 1,2-di(4-pyridyl)ethane, 1,3-di(4-pyridyl)propane, 1,2-bis(2-pyridyl)ethylene, 1,2-bis(4-pyridyl)ethylene, 1,2-bis(4-pyridyloxy)ethane, 4,4'-dipyridyl sulfide, 4,4'-dipyridyl disulfide, 1,2-bis(4-pyridyl)ethylene, 2,2'-dipicolylamine, 3,3'-dipicolylamine, tetramethylammonium hydroxide, tetraisopropylammonium hydroxide, tetrabutylammonium hydroxide, tetra-n-hexylammonium hydroxide, tetra-n-octylammonium hydroxide, phenyltrimethylammonium hydroxide, 3-(trifluoromethyl)phenyltrimethylammonium hydroxide, coline and N-methylpyrrolidone and the like.

Further, hindered amine compounds having a piperidine skeleton as disclosed in JP-A-11-52575 can also be used as a quencher.

It is preferable that the resist composition of the present invention contains 30 to 89.9% by weight of a resin component insoluble or poorly soluble itself in an alkali aqueous solution but becoming soluble in an alkali aqueous solution by the action of an acid, 10 to 69.9% by weight of a novolak resin having a area ratio of 25% or less, and 0.1 to 20% by weight of an acid generator, based on the total solid content.

When a nitrogen-containing basic organic compound is contained as a quencher, this compound is used preferably in an amount of 10% by weight or less likewise based on the total solid content. Further, this composition can contain also a small amount of various additives such as sensitizers, dissolution suppressing agents, other resins, surfactants, stabilizers, dyes and the like.

This resist composition usually takes a form of resist liquid composition containing components dissolved in a solvent, and applied on a substrate such as a silicon wafer and the like by an ordinary method. The solvent use here may be that dissolving the components, showing a suitable drying speed, and giving a uniform and smooth coated film after evaporation of the solvent. Those usually used in this field can be used. Examples thereof include glycol ether esters such as ethylcellosolve acetate, methylcellosolve acetate and propylene glycol monomethyl ether acetate; esters such as ethyl lactate, butyl acetate, amyl acetate and ethyl pyruvate; ketones such as acetone, methyl isobutyl ketone, 2-heptanone and cyclohexanone; cyclic esters such as γ-butyrolactone; alcohols such as 3-methoxy-1-butanol, and the like. These solvents can be used each alone or in combination of two or more.

A resist film applied on a substrate and dried is subjected to exposure treatment for patterning, then, subjected to heating treatment (PEB) for promoting a protective group-removing reaction, then, developer with an alkali developer. The alkali developer used here can be selected from various alkali aqueous solutions, and in general, aqueous solutions of tetramethylammonium hydroxide and (2-hydroxyethyl) trimethylammonium hydroxide (generally called coline) are often used.

EXAMPLES

Embodiments of the present invention have been explained above, however, the embodiments of the present invention disclosed above are only examples, and do no limit the scope of the present invention. The range of the present invention is shown by the claims, and include all variations in a range and meanings equivalent to descriptions of the claims. The following examples will illustrate the present invention further specifically, but do not limit the scope of the present invention.

In the examples, % and parts representing the content or use amount are by weight unless otherwise state. The weight average molecular weight (Mw) and the polydispersion (Mw/Mn) is a valued measured by gel permeation chromatography using polystyrene as a standard.

Synthesis Example 1

Production of Partial 1-ethoxyethylated Compound of Polyhydroxystyrene

Into a 1 liter egg plant-formed flask, 40 g of poly(p-hydroxystyrene) (333 mmol in terms of p-hydroxystyrene unit) and 47 mg (0.25 mmol) of p-toluenesulfonic acid monohydrate were charged, and dissolved in 720 g of propylene glycol monomethyl ether acetate. This solution was distilled under reduced pressure at a temperature of 60° C. and a pressure of 10 Torr, and dehydrated under azeotrope. The weight of the solution after distillation was 337 g. This solution was moved into a 500 ml four-necked flask purged with nitrogen, into this was dropped 12.0 g (166 mmol) of ethyl vinyl ether, then, they were reacted at 25° C. for 5 hours. To this reaction solution was added 62.3 g of propylene glycol monomethyl ether acetate and 320 g of methyl isobutyl ketone, further, 240 ml of ion exchanged water was added and the mixture was stirred. Then, the mixture was allowed to stand still, and the organic layer part was removed. To this organic solution was added again 240 ml of ion exchanged water, the mixture was stirred, then, allowed to stand still to cause separation, thus performing washing. Washing and separation by ion exchanged water were conducted again. Then, the organic layer was removed and distilled under reduced pressure to cause azeotropic distillation of water and methyl isobutyl ketone with propylene glycol monomethyl ether acetate, giving a propylene glycol monomethyl ether acetate solution.

The resulted liquid is a solution of a resin in which a hydroxyl group of poly(p-hydroxystyrene) is partially 1-ethoxyethyl etherified, and this resin was analyzed by 1H-NMR, to find that 36% of hydroxyl groups had been 1-ethoxyethyl etherified. This resin is called resin A1.

Synthesis Example 2

Synthesis of 2-ethyl-2-adamantyl Methacrylate and p-acetoxystyrene Copolymer (30:70)

Into a flask were charged 59.6 g (0.24 mol) of 2-ethyl-2-adamantyl methacrylate, 90.8 g (0.56 mol) of p-acetoxystyrene and 279 g of isopropanol and an atmosphere in the flask was purged with nitrogen, and the mixture was heated up to 75° C. Into this solution, a solution prepared by dissolving 11.05 g (0.048 mol) of dimethyl-2,2'-azobis(2-methylpropionate) in 22.11 g of isopropanol was dropped. The mixture was aged at 75° C. for about 0.3 hours, and under reflux for about 12 hours, then, diluted with acetone, and charged in methanol to cause crystallization, and the crystal was removed by filtration.

The weight of the resulted crude crystal of the copolymer of 2-ethyl-2-adamantyl methacrylate and p-acetoxystyrene was 250 g.

Synthesis Example 3

Synthesis of 2-ethyl-2-adamantyl Methacrylate and p-hydroxystyrene Copolymer (30:70)

Into a flask were charged 250 g of the crude crystal of the copolymer of 2-ethyl-2-adamantyl methacrylate and p-acetoxystyrene (30:70) obtained in Synthesis Example 2, 10.8 g (0.088 mol) of 4-dimethylaminopyridine and 239 g of methanol, and aged for 20 hours under reflux. After cooling, the mixture was neutralized with 8.0 g (0.133 mol) of glacial acetic acid and charged in water to cause crystallization, and the crystal was removed by filtration. Thereafter, the crystal was dissolved in acetone, charged in water to cause crystallization, the crystal was removed by filtration, and this operation was repeated three times, then, the resulted crystal was dried.

The weight of the resulted crystal of the copolymer of 2-ethyl-2-adamantyl methacrylate and p-hydroxystyrene was 102.8 g. The weight-average molecular weight was about 8200, the degree of dispersion was 1.68 (GPC method: reduced by polystyrene), and the copolymerization ratio was analyzed by a nuclear magnetic resonance ($^{13}$C-NMR) spectrometer to be about 30:70. This resin is called resin A2.

Synthesis Example 4

Synthesis of 2-ethyl-2-adamantyl Methacrylate/p-acetoxystyrene Copolymer (20:80)

Into a flask were charged 39.7 g (0.16 mol) of 2-ethyl-2-adamantyl methacrylate, 103.8 g (0.64 mol) of p-acetoxystyrene and 265 g of isopropanol and the mixture was heated up to 75° C. under nitrogen atmosphere. Into this solution, a solution prepared by dissolving 11.05 g (0.048 mol) of dimethyl-2,2'-azobis(2-methylpropionate) in 22.11 g of isopropanol was dropped. The mixture was aged at 75° C. for about 0.3 hours, and under reflux for about 12 hours, then, diluted with acetone, and the reaction solution was poured into a large amount of methanol to precipitate a polymer which was filtrated.

The weight of the resulted copolymer of 2-ethyl-2-adamantyl methacrylate and p-acetoxystyrene was 250 g (weight of wet cake containing methanol).

Synthesis Example 5

Synthesis of 2-ethyl-2-adamantyl Methacrylate/p-hydroxystyrene Copolymer (20:80)

Into a flask were charged 250 g of the copolymer of 2-ethyl-2-adamantyl methacrylate and p-acetoxystyrene (20:80) obtained in Synthesis Example 4, 10.4 g (0.084 mol) of 4-dimethylaminopyridine and 202 g of methanol, and aged for 20 hours under reflux. After cooling, the reaction liquid was neutralized with 7.6 g (0.126 mol) of glacial acetic acid and poured into a large amount of water to precipitate a polymer. The deposited polymer was filtrated, dissolved in acetone, then, poured into a large amount of water to cause precipitation, and this operation was repeated three times in total for purification.

The weight of the resulted copolymer of 2-ethyl-2-adamantyl methacrylate and p-hydroxystyrene was 95.9 g. The copolymer had a weight-average molecular weight of about 8600, a degree of dispersion of 1.65 (GPC method: reduced by polystyrene), and the copolymerization ratio thereof was analyzed by a nuclear magnetic resonance ($^{13}$C-NMR) spectrometer to be about 20:80. This resin is called resin A3.

Synthesis Example 6

Synthesis of Copolymer of 2-ethyl-2-adamantyl Methacrylate, 3-hydroxy-1-adamantyl Methacrylate and α-methacryloyloxy-γ-butyrolactone 2-Ethyl-2-adamantylmethacrylate, 3-hydroxy-1-adamantyl methacrylate and α-methacryloyloxy-γ- butyrolactone were charged in a molar ratio of 5:2.5:2.5 (20.0 g: 9.5 g: 7.3 g), and methyl isobutyl ketone in an amount of 2-fold by weight of the total monomer weight was added to give a solution. To this was added azobisisobutyronitrile as an initiator in an amount of 2 mol % based on the total monomer amount, and the mixture was heated at 80° C. for about 8 hours. Then, the reaction liquid was poured into a large amount of heptane to cause precipitation, and this operation was conducted three times, for purification. As a result, a copolymer having a weight-average molecular weight of about 9200 was obtained. This is called resin A4.

Synthesis Example 7

Synthesis of m-cresol Novolak Resin Excepting Lower Molecular Weight Body

Into a 1 L four-necked flask equipped with a reflux tube, stirring apparatus and thermometer were charged 218.3 g of m-cresol, 10.2 g of oxalic acid dihydrate, 68.7 g of 90% acetic acid and 203 g of methyl isobutyl ketone and the mixture was heated up to 80° C., and into this was dropped 143.2 g of a 37% formaldehyde aqueous solution over 1 hour. Thereafter, the mixture was heated up to reflux temperature and kept at the same temperature for 12 hours.

The resulted reaction solution was diluted with methyl isobutyl ketone, and washed with water and dehydrated, to obtain a 36.8% methyl isobutyl ketone solution of a novolak resin. 612 g of This resin solution was charged into a 5 L bottom-discharging type flask, diluted with 1119 g of methyl isobutyl ketone, and 1232 g of n-heptane was charged and the mixture was stirred at 60° C. and allowed to stand still, then, separated to obtain a novolak resin solution in the lower layer. This novolak resin solution was diluted with propylene glycol methyl ether acetate and then concentrated, to obtain a propylene glycol methyl ether acetate solution of a novolak resin. This resin is called resin A5.

This resin was measured by gel permeation chromatography (GPC) using polystyrene as a standard, to find that the area ratio of components having molecular weights of 1000 or less was 4.8% based on the total pattern area excepting unreacted monomers. This resin had a weight-average molecular weight of 8699.

Synthesis Example 8

Synthesis of m-cresol/p-cresol (=40/60) Novolak Resin Excepting Lower Molecular Weight Body Into a 1 L four-necked flask equipped with a reflux tube, stirring apparatus and thermometer were charged 87.3 g of m-cresol, 131.0 g of p-cresol, 6.1 g of oxalic acid dihydrate, 59.3 g of 90% acetic acid and 203 g of methyl isobutyl ketone and the mixture was heated up to 80° C. Into this was dropped 94.2 g of a 37% formaldehyde aqueous solution over 1 hour. Thereafter, the mixture was heated up to reflux temperature and kept at the same temperature for 12 hours. The resulted reaction solution was diluted with methyl isobutyl ketone, and washed with water and dehydrated, to obtain a 38.0% methyl isobutyl ketone solution of a novolak resin. 384 g of this resin solution was charged into a 5 L bottom-discharging type flask, diluted with 574 g of methyl isobutyl ketone, and 764 g of n-heptane was charged and the mixture was stirred at 60° C. and allowed to stand still, then, separated to obtain a novolak resin solution in the lower layer. This novolak resin solution was diluted with propylene glycol methyl ether acetate and then concentrated, to obtain a propylene glycol methyl ether acetate solution of a novolak resin. This resin is called resin A6.

This resin was measured by gel permeation chromatography (GPC) using polystyrene as a standard, to find that the area ratio of components having molecular weights of 1000 or less was 5.3% based on the total pattern area excepting unreacted monomers. This resin had a weight-average molecular weight of 9846.

Synthesis Example 9

Synthesis of m-cresol/2,5-xylenol (=100/40) Novolak Resin Excepting Lower Molecular Weight Body Into a 1 L four-necked flask equipped with a reflux tube, stirring apparatus and thermometer were charged 150.4 g of m-cresol, 67.9g of 2,5-xylenol, 10.0 g of oxalic acid dihydrate, 66.3 g of 90% acetic acid and 218 g of methyl isobutyl ketone and the mixture was heated up to 80° C. Into this was dropped 142.2 g of a 37% formaldehyde aqueous solution over 1 hour. Thereafter, the mixture was heated up to reflux temperature and kept at the same temperature for 12 hours. The resulted reaction solution was diluted with methyl isobutyl ketone, and washed with water and dehydrated, to obtain a 38.0% methyl isobutyl ketone solution of a novolak resin. 644 g of this resin solution was charged into a 5 L bottom-discharging type flask, diluted with 411 g of methyl isobutyl ketone. Thereto, 715 g of n-heptane was charged and the mixture was stirred at 60° C. and allowed to stand still, then, separated to obtain a novolak resin solution in the lower layer. This novolak resin solution was diluted with propylene glycol methyl ether acetate and then concentrated, to obtain a propylene glycol methyl ether acetate solution of a novolak resin. This resin is called resin A7.

This resin was measured by gel permeation chromatography (GPC) using polystyrene as a standard, to find that the area ratio of components having molecular weights of 1000 or less was 11.9% based on the total pattern area excepting unreacted monomers. This resin had a weight-average molecular weight of 6119.

Synthesis Example 10

Synthesis of m-cresol Novolak Resin Excepting Lower Molecular Weight Body

Into a 1 L four-necked flask equipped with a reflux tube, stirring apparatus and thermometer was charged 218.3 g of m-cresol and 0.51 g of oxalic acid dehydrate and the mixture was heated up to 60° C., and into this was dropped 49.2 g of a 37% formaldehyde aqueous solution over 1.5 hours. Thereafter, the mixture was heated up to reflux temperature and kept at the same temperature for 3 hours. The resulted reaction solution was dehydrated and deprived of m-cresol by distillation, to obtain 116 g of concentrated mass. Thereafter, methyl isobutyl ketone was added to this concentrated mass and the mixture was washed with water and concentrated. Then, propylene glycol methyl ether acetate was added to the concentrated mass for dilution and then the mixture was concentrated to obtain, to obtain a propylene glycol methyl ether acetate solution of a novolak resin. This resin is called resin A8.

This resin was measured by gel permeation chromatography (GPC) using polystyrene as a standard, to find that the area ratio of components having molecular weights of 1000 or less was 96.9% based on the total pattern area excepting unreacted monomers. This resin had a weight-average molecular weight of 685.

Resin A9: m-cresol/p-cresol (=60/40) Novolak Resin Not Excepting Lower Molecular Weight Body m-cresol/p-cresol (=60/40) novolak resin manufactured by Asahi Organic Chemicals Industry Co., Ltd is called resin A9. This resin was measured by gel permeation chromatography (GPC) using polystyrene as a standard, to find that the area ratio of components having molecular weights of 1000 or less was 26.3% based on the total pattern area excepting unreacted monomers. This resin had a weight-average molecular weight of 4375.

Synthesis Example 11

Production of Partial 1-ethoxyethylated Polyhydroxystyrene

Into a flask was charged 20 g of poly(p-vinylphenol) ["Linker M S-2P" manufactured by Maruzen Petrochemical Co., Ltd., weight-average molecular weight: 6700, degree of dispersion: 3.37](167 mmol in terms of vinylphenol unit) and 120 g of methyl isobutyl ketone, and they were dissolved by stirring, then, 3.2 mg (0.0167 mmol) of p-toluenesulfonic acid monohydrate was added. Into this resin solution was dropped 16.2 g (225 mmol) of ethyl vinyl ether, then, they were reacted at room temperature for 3 hours. To this reaction solution was added 46.7 ml of ion exchanged water and the mixture was stirred, then, allowed to standstill, and separated to remove an organic layer portion. This washing with ion exchange water was repeated four more times, meaning five times in total. Thereafter, the organic layer was removed and distilled under reduced pressure for concentration. Then, for removal of water and methyl isobutyl ketone by azeotropic distillation, propylene glycol monomethyl ether acetate was added and the mixture was distilled under reduced pressure to attain concentration, to obtain 55.4 g of a resin solution.

The resulted liquid is a solution of a resin in which hydroxyl groups in poly(p-hydroxystyrene) have been partially 1-ethoxyethyl etherified, and this resin was analyzed by $^1$H-NMR to find that 51.7% of hydroxyl groups had been 1-ethoxyethyl etherified. The concentration of the resin liquid was measured by using a dry weight reduction method to find it was 37.2%. This resin is called resin A10.

Synthesis Example 12

Production of Partial 1-ethoxyethylated Polyhydroxystyrene

Into a flask was charged 20 g of poly(p-vinylphenol) ["Linker M S-2P" manufactured by Maruzen Sekiyu Kagaku K. K., weight-average molecular weight: 6700, degree of dispersion: 3.37](167 mmol in terms of vinylphenol unit) and 120 g of methyl isobutyl ketone, and they were dissolved by stirring, then, 3.2 mg (0.0167 mmol) of p-toluenesulfonic acid monohydrate was added. Into this resin solution was dropped 11.8 g (163 mmol) of ethyl vinyl ether, then, they were reacted at room temperature for 3 hours. To this reaction solution was added 46.7 ml of ion exchanged water and the mixture was stirred, then, allowed to standstill, and separated to remove an organic layer portion. This washing with ion exchange water was repeated four more times, meaning five times in total. Thereafter, the organic layer was removed and distilled under reduced pressure for concentration. Then, for removal of water and methyl isobutyl ketone by azeotropic distillation, propylene glycol monomethyl ether acetate was added and the mixture was distilled under reduced pressure to attain concentration, to obtain 53.8 g of a resin solution.

The resulted liquid is a solution of a resin in which hydroxyl groups in poly(p-hydroxystyrene) have been partially 1-ethoxyethyl etherified, and this resin was analyzed by $^1$H-NMR to find that 33.9% of hydroxyl groups had been 1-ethoxyethyl etherified. The concentration of the resin liquid was measured by using a dry weight reduction method to find it was 37.8%. This resin is called resin A11.

Resin A12: m-cresol Novolak Resin Not Excepting Lower Molecular Weight Body m-cresol novolak resin manufactured by Asahi Organic Chemicals Industry Co., Ltd is called resin A12. This resin was measured by gel permeation chromatography (GPC) using polystyrene as a standard, to find that the area ratio of components having molecular weights of 1000 or less was 26.5% based on the total pattern area excepting unreacted monomers. This resin had a weight-average molecular weight of 3835.

Synthesis Example 13

Production of Partial 1-ethoxyethylated Compound of Polyhydroxystyrene

Into a 1 liter egg plant-formed flask, 40 g of poly(p-hydroxystyrene) (333 mmol in terms of p-hydroxystyrene unit) and 47 mg (0.25 mmol) of p-toluenesulfonic acid monohydrate were charged, and dissolved in 720 g of propylene glycol monomethyl ether acetate. This solution was distilled under reduced pressure at a temperature of 60° C. and a pressure of 10 Torr, and dehydrated under azeotrope. The weight of the solution after distillation was 337 g. This solution was moved into a 500 ml four-necked flask purged with nitrogen, into this was dropped 16.6 g (230 mmol) of ethyl vinyl ether, then, they were reacted at 25° C. for 5 hours. To this reaction solution were added 62.3 g of propylene glycol monomethyl ether acetate and 320 g of methyl isobutyl ketone, further, 240 ml of ion exchanged water was added and the mixture was stirred. Then, the mixture was allowed to stand still, and the organic layer part was removed. To this organic solution was added again 240 ml of ion exchanged water, the mixture was stirred, then, allowed to stand still to cause separation, thus performing washing. Washing and separation by ion exchanged water were conducted again, then, the organic layer was removed and distilled under reduced pressure to cause azeotropic distillation of water and methyl isobutyl ketone with propylene glycol monomethyl ether acetate, giving a propylene glycol monomethyl ether acetate solution. The resulted liquid is a solution of a resin in which a hydroxyl group of poly(p-hydroxystyrene) is partially 1-ethoxyethyl etherified, and this resin was analyzed by 1H-NMR, to find that 50% of hydroxyl groups had been 1-ethoxyethyl etherified. This resin is called resin A13.

Synthesis Example 14

Production of Partial 1-ethoxyethylated Compound of Polyhydroxystyrene

Into a 1 liter egg plant-formed flask, 40 g of poly(p-hydroxystyrene) (333 mmol in terms of p-hydroxystyrene unit) and 47 mg (0.25 mmol) of p-toluenesulfonic acid monohydrate were charged, and dissolved in 720 g of propylene glycol monomethyl ether acetate. This solution was distilled under reduced pressure at a temperature of 60° C. and a pressure of 10 Torr, and dehydrated under azeotrope. The weight of the solution after distillation was 337 g. This solution was moved into a 500 ml four-necked flask purged with nitrogen, into this was dropped 10.0 g (138 mmol) of ethyl vinyl ether, then, they were reacted at 25° C. for 5 hours. To this reaction solution was added 62.3 g of propylene glycol monomethyl ether acetate and 320 g of methyl isobutyl ketone, further, 240 ml of ion exchanged water was added and the mixture was stirred. Then, the mixture was allowed to stand still, and the organic layer part was removed. To this organic solution was added again 240 ml of ion exchanged water, the mixture was stirred, then, allowed to stand still to cause separation, thus performing washing. Washing and separation by ion exchanged water were conducted again, then, the organic layer was removed and distilled under reduced pressure to cause azeotropic distillation of water and methyl isobutyl ketone with propylene glycol monomethyl ether acetate, giving a propylene glycol monomethyl ether acetate solution. The resulted liquid is a solution of a resin in which a hydroxyl group of poly(p-hydroxystyrene) is partially 1-ethoxyethyl etherified, and this resin was analyzed by 1H-NMR, to find that 30% of hydroxyl groups had been 1-ethoxyethyl etherified. This resin is called resin A14.

Synthesis Example 15

Fractionation of Phenol Novolak Resin 50 g of a phenol novolak resin having a weight-average molecular weight of 5360 (PSM-4326, manufactured by Gunei Chemical Industry Co., Ltd.) was charged into a 1 L bottom-discharging type flask, diluted with 335 g of methyl isobutyl ketone, and 273 g of n-heptane was charged and the mixture was stirred at 60° C. and allowed to stand still, then, separated to obtain a novolak resin solution in the lower layer. This novolak resin solution was diluted with propylene glycol methyl ether acetate and concentrated, to obtain a propylene glycol methyl ether acetate solution of a novolak resin. This resin is called resin A15.

This resin was measured by gel permeation chromatography (GPC) using polystyrene as a standard, to find that the area ratio of components having molecular weights of 1000 or less was 6.7% based on the total pattern area excepting unreacted monomers. This resin had a weight-average molecular weight of 10945.

Acid generator B1: bis(cyclohexylsulfonyl)diazomethane ["DAM-301", manufactured by Midori Kagaku Co., Ltd.]

Acid generator B2: triphenylsulfonium 2,4,6-triisopropylbenzenesulfonate

Acid generator B3: (5-tosyloxyimino-5H-thiophen-2-ylidene)-(2-methylphenyl)acetonitrile Quencher C1: 2,6-diisopropylaniline Quencher C2: dicyclohexylmethylamine Quencher C3: trimethylphenylammonium hydroxide Quencher C4: tetra-n-butylammonium hydroxide Quencher C5: tris[2-methoxy(2-ethoxyethyl)]amine Coloring matter D1:

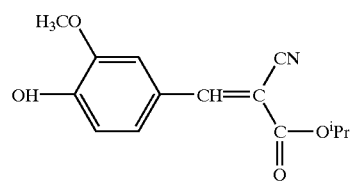

Examples 1 to 6 and Comparative Examples 1 to 2

Resins (13.5 parts in total, reduced by solid content) were mixed at ratios (reduced by solid content) shown in Table 1, and quenches of kinds and quantities shown in Table 1, and in Examples 1 to 5 and Comparative Examples 1 to 2, 0.6 parts of the acid generator B1 and 0.45 parts of the acid generator B2, in Example 6, 0.15 parts of the acid generator B2, were dissolved using propylene glycol monomethyl ether acetate as a dilution solvent in all cases. Further, the solutions were filtrated through a fluorine resin filter having a pore diameter of 0.2 μm to prepare resist solutions.

The resist solutions were applied on a silicone wafer treated with hexamethyldisilazane or a silicone water on which an organic reflection prevention film (BARC) had been applied, using a spin coator so that the film thickness after drying was 0.42 μm or 0.70 μm as shown in Table 2. The organic reflection prevention film was formed by applying DUV-42 (manufactured by Brewer) so that the thickness was 600 Å under baking conditions of a temperature of 215° C. and a time of 60 seconds. Prebake after application of the resist solution was conducted on a hot plate for 60 seconds at temperatures shown in Table 2.

The wafer on which the resist film had been thus formed was exposed through line and space pattern using a KrF excimer laser exposing machine [NSR S203B manufactured by Nikon Corp., NA=0.68, σ=0.75, ⅔orbicular illumination exposure]. Then, post exposure bake was conducted at temperatures shown in Table 2 for 60 seconds on a hot plate, further, paddle development was conducted for 60 seconds using a 2.38% tetramethylammonium hydroxide aqueous solution. The pattern after development was observed by a scanning electron microscope, and the effective sensitivity, resolution and profile were checked by the following methods, and the results are shown in Table 2.

Effective sensitivity: It is represented by exposure amount at which 0.25 μm line and space pattern is 1:1.

Resolution: It is represented by the minimum size of line and space pattern separating by the exposure amount at effective sensitivity.

TABLE 1

| Example No. | Resin | | | Quencher |
|---|---|---|---|---|
| Example 1 | A2/75% | | A7/25% | C1/0.049 parts |
| Example 2 | A2/50% | | A7/50% | C1/0.049 parts |
| Example 3 | A2/50% | | A5/50% | C1/0.049 parts |
| Example 4 | A2/75% | | A6/25% | C1/0.049 parts |
| Example 5 | A4/50% | | A5/50% | C1/0.049 parts |
| Example 6 | A1/50% | | A5/50% | C2/0.021 parts |
| Comparative example 1 | A2/25% | A3/25% | A9/50% | C1/0.049 parts |
| Comparative example 2 | A2/50% | A5/25% | A8/25% | C1/0.049 parts |

In Comparative Example 2, since novolak resins A5 and A8 are mixed at 1:1, the mixed novolak resin has an area ratio of components having molecular weights of 1000 or less based on the total pattern area excepting unreacted monomers of 50.9%=(4.8+96.9)/2.

TABLE 2

| Example No. | Film thickness [μm] | PEB temperature [° C.] | Effective Sensitivity [mJ/cm²] | Resolution [μm] |
|---|---|---|---|---|
| Example 1 | 0.42 | 110 | 33 | 0.12 |
| Example 2 | 0.42 | 110 | 27 | 0.13 |
| Example 3 | 0.42 | 110 | 27 | 0.13 |
| Example 4 | 0.42 | 110 | 33 | 0.12 |

TABLE 2-continued

| Example No. | Film thickness [μm] | PEB temperature [° C.] | Effective Sensitivity [mJ/cm²] | Resolution [μm] |
|---|---|---|---|---|
| Example 5 | 0.42 | 130 | 33 | 0.15 |
| Example 6 | 0.70 | 100 | 12 | 0.22 |
| Comparative example 1 | 0.42 | 110 | — | >0.30 |
| Comparative example 2 | 0.42 | 110 | — | >0.30 |

Examples 7 to 8 and Comparative Example 3

Resins (13.5 parts in total, reduced by solid content) were mixed at ratios (reduced by solid content) shown in Table 3, and 0.1 part of the acid generator B3 and 0.005 parts of the quencher C3, were dissolved using propylene glycol monomethyl ether acetate as a dilution solvent in all cases. Further, the solutions were filtrated through a fluorine resin filter having a pore diameter of 0.2 μm to prepare resist solutions.

The resist solutions were applied on a silicone wafer treated with hexamethyldisilazane using a spin coater so that the film thickness after drying was 1.49 μm. Prebake after application of the resist solution was conducted on a hot plate for 60 seconds at a temperature of 90° C. The wafer on which the resist film had been thus formed was exposed through line and space pattern using a reduction projecting exposing machine ["NSR-2005i9C" manufactured by Nikon Corp., NA=0.56, σ=0.8] having an exposure wavelength of 365 nm (i line) while changing the exposure amount stepwise. Then, post exposure bake was conducted at a temperature of 110° C. for 60 seconds on a hot plate, further, paddle development was conducted for 60 seconds using a 2.38% tetramethylammonium hydroxide aqueous solution (developer SOPD, manufactured by Sumitomo Chemical Co., Ltd.). The pattern after development was observed by a scanning electron microscope, and the effective sensitivity, resolution and profile were checked by the following methods. The results are shown in Table 3.

Effective sensitivity: It is represented by exposure amount at which 1.0 μm line and space pattern is 1:1.

Resolution: It is represented by the minimum size of line and space pattern separating by the exposure amount at effective sensitivity.

TABLE 3

| Example No. | Resin | | | Effective Sensitivity [msec/cm²] | Resolution [μm] |
|---|---|---|---|---|---|
| Example 7 | A10/50% | | A5/50% | 46 | 0.30 |
| Example 8 | A10/25% | A11/25% | A5/50% | 36 | 0.38 |
| Comparative example 3 | A10/25% | A11/25% | A12/50% | 20 | 0.50 |

Example 9

Resins (13.5 parts in total, reduced by solid content) were mixed at a ratio (reduced by solid content) shown in Table 4, and 0.01 part of the acid generator B3, 0.00635 parts of the quencher C4 and 0.25 parts of the coloring matter D1, were dissolved using propylene glycol monomethyl ether acetate as a dilution solvent. Further, the solution was filtrated through a fluorine resin filter having a pore diameter of 0.2 μm to prepare a resist solution.

The resist solution was applied on a silicone wafer treated with hexamethyldisilazane using a spin coater so that the film thickness after drying was 1.49 μm as shown in Table 4. Prebake after application of the resist solution was conducted on a hot plate for 60 seconds at a temperature shown in Table 5. The wafer on which the resist film had been thus formed was exposed through line and space pattern in the same manner as in Example 7. Then, post exposure bake was conducted at a temperature shown in Table 5 for 60 seconds on a hot plate, further, paddle development was conducted for 60 seconds using a 2.38% tetramethylammonium hydroxide aqueous solution. The pattern after development was observed by a scanning electron microscope, and the effective sensitivity, resolution and profile were checked by the same methods as in Example 7. The results are shown in Table 6.

TABLE 4

| Example No. | Resin | | | Quencher |
|---|---|---|---|---|
| Example 9 | A13/50% | A5/40% | A15/10% | C4 |

TABLE 5

| Example No. | Prebake temperature | Post exposure bake temperature |
|---|---|---|
| Example 9 | 90° C. | 110° C. |

TABLE 6

| Example No. | Film thickness [μm] | Effective Sensitivity [mJ/cm²] | Resolution [μm] | Roughness |
|---|---|---|---|---|
| Example 9 | 1.49 | 33 | 0.35 | ○ |

Roughness: In this example, the section of the pattern was viewed from the side surface, unevenness due to standing wave was not observed.

The chemical amplification type positive resist composition of the present invention can reduce cost without deteriorating basic abilities such as sensitivity, resolution and the like, and shows small unevenness due to standing wave, and can improved pattern profile, particularly, line edge roughness.

What is claimed is:

1. A chemical amplification type positive resist composition comprising:

a novolak resin, a resin insoluble or poorly soluble itself in an alkali aqueous solution but becoming soluble in an alkali aqueous solution by the action of an acid, and an acid generator, wherein when the novolak resin is measured by gel permeation chromatography (GPC) using a 254 nm UV detector using polystyrene as a standard, the area ratio of components having molecular weights of 1000 or less is 25% or less based on the total pattern area excepting unreacted monomers, and wherein the resin insoluble or poorly soluble itself in an alkali aqueous solution but becoming soluble in an alkali aqueous solution by the action of an acid has a structural unit of the following formula (I)

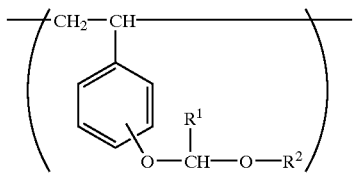

wherein, $R^1$ represents an alkyl having 1 to 4 carbon atoms, and $R^2$ represents an alkyl having 1 to 6 carbon atoms or a cycloalkyl having 5 to 7 carbon atoms, provided that $R^1$ and $R^2$ may together form a trimethylene chain or tetramethylene chain.

2. The resist composition according to claim 1 wherein the resin becoming soluble in an alkali aqueous solution by the action of an acid further has a structural unit derived from p-hydroxystyrene.

3. The composition according to claim 1 wherein the novolak resin is a phenol novolak resin.

4. The composition according to claim 1 wherein the novolak resin is a cresol novolak resin.

* * * * *